United States Patent
Wong (10) Patent No.: US 10,708,655 B2
(45) Date of Patent: Jul. 7, 2020

(54) DYNAMIC ITEM HIGHLIGHTING SYSTEM

(71) Applicant: TiVo Solutions Inc., San Carlos, CA (US)

(72) Inventor: Kirk D. Wong, Fremont, CA (US)

(73) Assignee: TIVO SOLUTIONS INC., San Jose, CA (US)

( * ) Notice: Subject to any disclaimer, the term of this patent is extended or adjusted under 35 U.S.C. 154(b) by 0 days.

(21) Appl. No.: 15/415,689

(22) Filed: Jan. 25, 2017

(65) Prior Publication Data

US 2017/0134804 A1    May 11, 2017

Related U.S. Application Data

(63) Continuation of application No. 15/130,455, filed on Apr. 15, 2016, now Pat. No. 9,591,357, which is a (Continued)

(51) Int. Cl.
| | |
|---|---|
| *H04N 21/442* | (2011.01) |
| *H04N 21/482* | (2011.01) |
| *H04N 21/485* | (2011.01) |
| *H04N 21/45* | (2011.01) |
| *H04N 21/431* | (2011.01) |

(Continued)

(52) U.S. Cl.
CPC ... *H04N 21/44222* (2013.01); *H04N 21/2543* (2013.01); *H04N 21/25891* (2013.01); *H04N 21/4147* (2013.01); *H04N 21/4318* (2013.01); *H04N 21/4524* (2013.01); *H04N 21/4532* (2013.01); *H04N 21/4667* (2013.01); *H04N 21/482* (2013.01); *H04N 21/4823* (2013.01); *H04N 21/4826* (2013.01); *H04N 21/4828* (2013.01); *H04N 21/4858* (2013.01)

(58) Field of Classification Search
CPC ....... H04N 21/44222; H04N 21/25891; H04N 21/4826; H04N 21/4318; H04N 21/4147; H04N 21/4667; H04N 21/2543
See application file for complete search history.

(56) References Cited

U.S. PATENT DOCUMENTS

| | | |
|---|---|---|
| 6,721,953 B1 | 4/2004 | Bates et al. |
| 8,712,218 B1 | 4/2014 | Begeja et al. |

(Continued)

OTHER PUBLICATIONS

U.S. Appl. No. 13/971,743, Non-Final Office Action dated Jan. 7, 2014.

(Continued)

*Primary Examiner* — John R Schnurr
(74) *Attorney, Agent, or Firm* — Haley Guiliano LLP (57) ABSTRACT

A method and apparatus for highlighting a program listing in a set of program listings based on selection criteria. The selection criteria may indicate that the a broadcaster has agreed to pay a service provider in return for the service provider ensuring that a program listing, corresponding to the program of the broadcaster, is highlighted in a program page that displays a set of program listings, such as television program listings. If there are multiple program listings, listed in a program page, that are to be highlighted, then details of the respective contracts may be used to determine which program listing to highlight. Such details may include the total contract value, a ratio of contract value-to-page view, and/or the time of contract formation.

20 Claims, 6 Drawing Sheets

Related U.S. Application Data continuation of application No. 14/870,891, filed on Sep. 30, 2015, now Pat. No. 9,326,037, which is a continuation of application No. 14/331,416, filed on Jul. 15, 2014, now Pat. No. 9,161,092, which is a continuation of application No. 13/971,743, filed on Aug. 20, 2013, now Pat. No. 8,782,686, which is a continuation of application No. 13/437,827, filed on Apr. 2, 2012, now Pat. No. 8,516,524, which is a continuation of application No. 12/485,706, filed on Jun. 16, 2009, now Pat. No. 8,255,955.

(51) Int. Cl.
  *H04N 21/466* (2011.01)
  *H04N 21/2543* (2011.01)
  *H04N 21/258* (2011.01)
  *H04N 21/4147* (2011.01)

(56) References Cited

U.S. PATENT DOCUMENTS

| | | | |
|---|---|---|---|
| 9,161,092 B2 | 10/2015 | Wong | |
| 9,326,037 B2 | 4/2016 | Wong | |
| 2002/0147976 A1* | 10/2002 | Yuen | H04N 5/44543 725/40 |
| 2003/0226144 A1 | 12/2003 | Thurston et al. | |
| 2004/0003404 A1 | 1/2004 | Boston et al. | |
| 2004/0003413 A1 | 1/2004 | Boston et al. | |
| 2004/0183756 A1 | 9/2004 | Freitas et al. | |
| 2008/0184309 A1 | 7/2008 | Allison et al. | |
| 2009/0064222 A1 | 3/2009 | Dawson et al. | |
| 2011/0179451 A1* | 7/2011 | Miles | H04N 5/445 725/42 |
| 2014/0325563 A1 | 10/2014 | Wong | |
| 2016/0029099 A1 | 1/2016 | Wong | |
| 2016/0234552 A1 | 8/2016 | Wong | |

OTHER PUBLICATIONS

U.S. Appl. No. 13/971,743, Notice of Allowance dated Apr. 28, 2014.
U.S. Appl. No. 14/331,416, Non-Final Office Action dated Aug. 19, 2014.
U.S. Appl. No. 14/331,416, Final Office Action dated Jan. 9, 2015.
U.S. Appl. No. 14/331,416, Notice of Allowance dated Jun. 11, 2015.
U.S. Appl. No. 14/870,891, Notice of Allowance dated Dec. 23, 2015.
U.S. Appl. No. 15/130,455, Non-Final Office Action dated Aug. 19, 2016.
U.S. Appl. No. 15/130,455, Notice of Allowance dated Jan. 13, 2017.

* cited by examiner

FIG. 2

Recorded List

| | | |
|---|---|---|
| *Enter TiVo KidZone* | | |
| Thomas & Friends | Sat | 9/2 |
| Rocketboom | Sat | 9/2 |
| Home Movies: One True Media (3) | Fri | 9/1 |
| Sports by Sports Illustrated (5) | Thu | 8/31 |
| ‹ How I Met Your Mother | Thu – 8/31 › |
| West Wing, The | Thu | 8/31 |
| POKER (3) | Wed | 8/30 |
| HD Recordings (2) | Wed | 8/30 |

Groups sorted by date (press ENTER to change)

PAGE VIEW 300

PROGRAM SELECTOR OBJECT 302

DYNAMIC ITEM HIGHLIGHTING SYSTEM

BENEFIT CLAIM

This application claims the benefit as a Continuation of U.S. patent application Ser. No. 15/130,455, filed Apr. 15, 2016, which is a Continuation of U.S. patent application Ser. No. 14/870,891, filed Sep. 30, 2015, which is a Continuation of U.S. patent application Ser. No. 14/331,416, filed Jul. 15, 2014, which is a Continuation of U.S. patent application Ser. No. 13/971,743, filed Aug. 20, 2013, now U.S. Pat. No. 8,782,686 issued Jul. 15, 2014; which is a Continuation of U.S. patent application Ser. No. 13/437,827, filed Apr. 2, 2012, now U.S. Pat. No. 8,516,524 issued Aug. 20, 2013; which is a continuation of U.S. patent application Ser. No. 12/485,706, filed Jun. 16, 2009, now U.S. Pat. No. 8,255,955 issued Aug. 28, 2012, the entire contents of the preceding are hereby incorporated by reference as if fully set forth herein, under 35 U.S.C. § 120. The Applicant hereby rescinds any disclaimer of claim scope in the parent application or the prosecution history thereof and advises the USPTO that the claims in this application may be broader than any claim in the parent application.

FIELD OF THE INVENTION

Embodiments of the invention generally relate to digital video recorders (DVRs). Embodiments of the invention relate more specifically to techniques for highlighting certain programs based on revenue information that is received from a server that is located remotely from the DVR that will actually be recording those programs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of multimedia players to the consumer world has revolutionized the way users watch and record video programs. Some multimedia players, such as digital video recorders ("DVRs"), eliminate many of the complications of VCRs and the need for video tapes. DVRs record television programs on a hard drive that is capable of storing a large number of television programs.

Sophisticated, modern DVRs are capable of scheduling the recordings of programs that are to be televised some time in the future. If a DVR user is interested in recording all episodes of a televised series, then the user can instruct his DVR to get a "season pass" for that series. In response to such an instruction, the DVR automatically determines, from electronic programming guide ("EPG") data, times at which episodes of that series are going to be televised in the future. Usually, whenever an episode of the selected series is about to be broadcasted, the DVR automatically tunes to the channel on which the episode is going to be broadcasted and records that episode on the DVR's hard disk drive. For as long as the recorded episode remains on the DVR's hard disk drive, the DVR's user can instruct the DVR to replay the episode to the user's television. Conveniently, this allows the user to watch programs in which the user is interested at times other than those program's broadcasting times. The user does not even need to know, beforehand, the exact times at which those programs are going to be broadcasted.

When a DVR schedules a program for future recording, the DVR adds the program to a "to do" list that the DVR maintains within the DVR's own storage mechanisms. A DVR schedules a program that is specifically designated by a user and/or that is predicted to be of interest to the user. Whenever a program on the DVR's "to do" list is broadcasted, the DVR automatically records that program. Over time, a DVR may record and store numerous programs.

When a user decides to view a program using a DVR, the user may view a recorded program or a "live" program. The user may use EPG data to view the names of currently playing or future programs. Additionally or alternatively, the user may view a recorded list that lists the programs that have been recorded by the DVR. Because the number of programs on either list tends to be too great to fit legibly on a television (or computer) display, the lists are divided such that a user must scroll through two or more "page views" that each lists a different plurality of programs.

In one approach, for each page view, a program selector object automatically highlights a certain program in the page view, such as the top-most program in the page view. The program selector object is a display object that highlights a particular program. In order to select the particular program for viewing, a user simply selects a single button on a DVR remote control. If the user does not wish to view the highlighted program, then the user must select an up arrow or a down arrow on the DVR remote control to cause the program selector object to highlight a program that is displayed above or below the currently highlighted program. The user may also select a page up or down button on the DVR control to cause a new page view of programs to be displayed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 System Structural Overview
3.0 DVR Overview
   3.1 Home Media Engine
   3.2 User Interface
4.0 Program List
5.0 Program Page View
6.0 Dynamically Highlighting Programs Based On Selection Criteria
   6.1 Independent Scenario
      6.1.1 EPG Data
      6.1.2 Recorded List
   6.2 Selection Criteria For Highlighting A Program
   6.3 Format of Selection Criteria
      6.3.1 Ordered List
      6.3.2 Database Elements
      6.3.3 Alpha List
   6.4 Dependent Scenario
7.0 Business Models
8.0 Implementation Mechanisms

1.0 General Overview

Techniques are provided herein for dynamically highlighting certain programs in program lists that are displayed to users. One or more broadcasters contract with a service provider to pay for a number of page views that have one or more programs listed therein to be highlighted. If a program is highlighted in a page view, then a user is more likely to select that program for viewing. The contract information (such as the revenue information) is used to determine which, if any, programs in a page view will be highlighted.

As used herein, a "program" is any content, visual and/or audible, that is presented through a television (or computer) display and/or speakers. Non-limiting examples of a program include an episode of a multi-episode series, a movie, a sporting event, and a news presentation.

2.0 System Structural Overview

Figure 1:
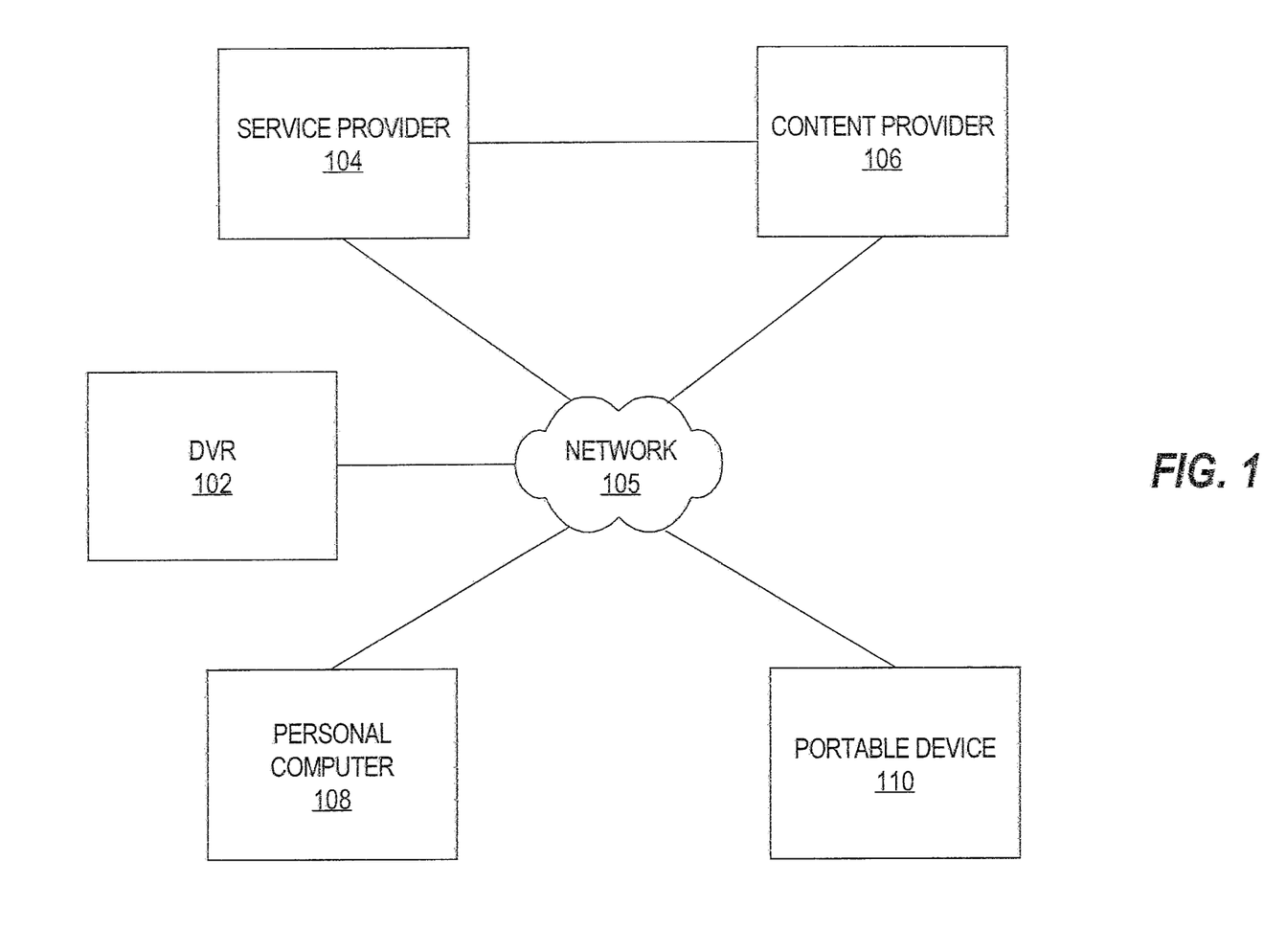
FIG. 1 illustrates an example system according to an embodiment of the invention.

FIG. 1 illustrates an example system according to an embodiment of the invention. The system contains at least one client device such as DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Embodiments of the invention are not limited to the type of device upon which DVR 102 is implemented. For example, DVR 102 may be implemented, in part or in whole, on a PC (personal computer), a video player, a DVD player, or a portable computing device, such as a cell phone or personal digital assistant (PDA).

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 106 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests. In another embodiment, DVR 102, personal computer 108, and portable device 110 can communicate with each other to transfer content, metadata, or any other data through network 105, communication connection, or any local network.

In another embodiment, content provider 106 provides, to service provider 104, content data or any metadata, including promotional data, icons, web data, and other information. Service provider 104 may then interpret the metadata and provide the content data and metadata to DVR 102, personal computer 108, or portable device 110.

3.0 DVR Overview

Figure 2:
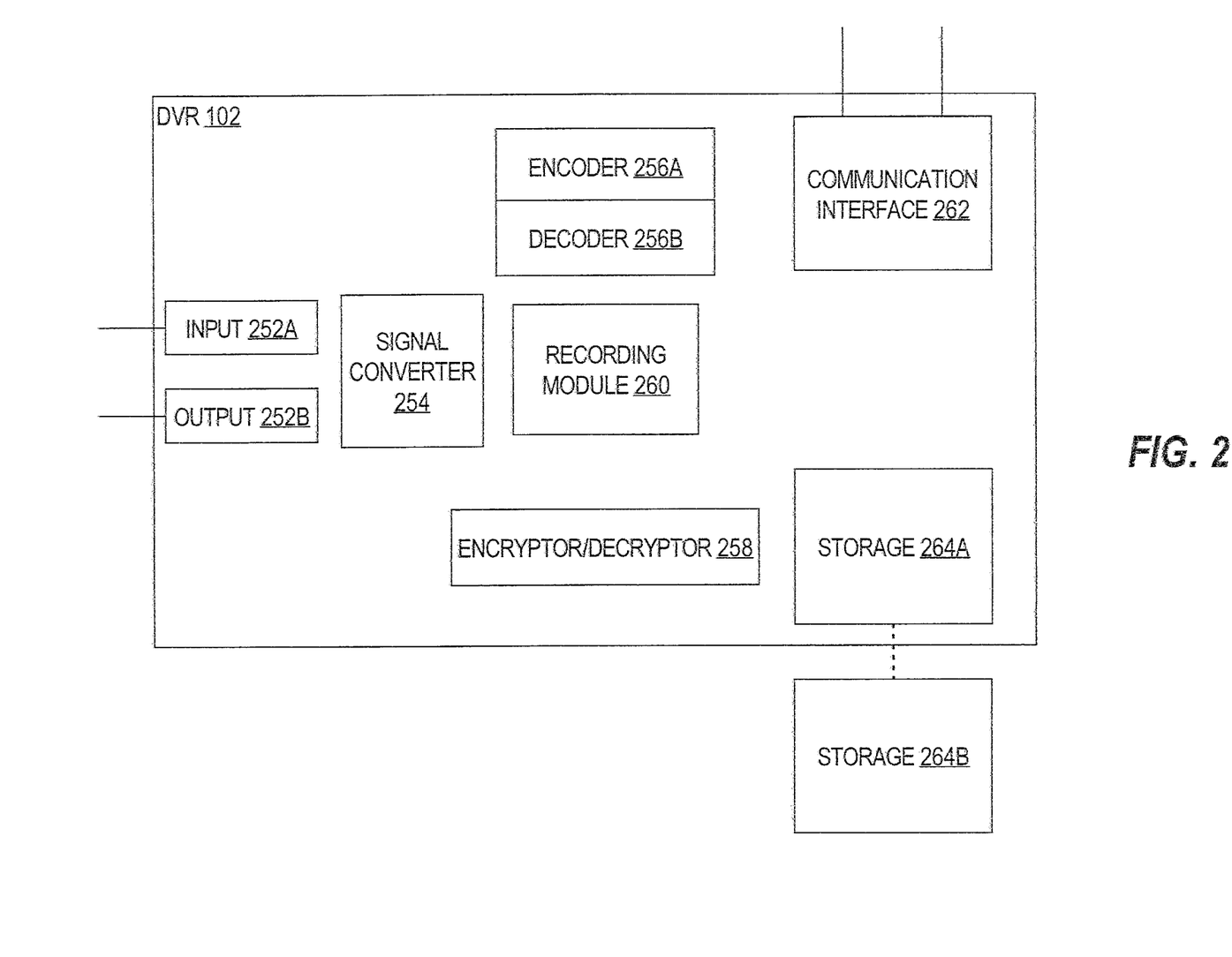
FIG. 2 is a block diagram illustrating a general overview of the components of a Digital Video Recorder (DVR), according to an embodiment of the invention.

FIG. 2 is a block diagram illustrating a general overview of the components of a DVR, according to an embodiment of the invention. DVR 102 generally comprises a plurality of components, signified by signal converter 254, that are necessary to digitize an analog television signal and convert it into a digital data stream or accept a digital data stream. An example of the internal structure and operation of a DVR is further described in U.S. Pat. No. 6,233,389, which is referenced previously.

DVR 102 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

Recording module 260 records the incoming data stream by storing the digital data stream on at least one storage facility, signified by storage 264A/264B that is designed to retain segments of the digital data stream. Storage 264A/264B may be one or more non-volatile storage devices (e.g., hard disk, solid state drive, USB external hard drive, USB external memory stick, USB external solid state drive, network accessible storage device, etc.) that are internal 264A and/or external 264B. Signal converter 254 retrieves segments of the data stream, converts the data stream into an analog signal, and then modulates the signal onto a RF carrier, via output 252B, through which the signal is delivered to a standard TV set. Output 252B may alternatively deliver a digital signal to a TV set or video monitor. For example, DVR 102 may utilize a Digital Visual Interface port (DVI) for sending digital signals to a TV via a DVI cable.

DVR 102 also includes a communication interface 262, through which DVR 102 communicates with network 105 via Ethernet, wireless network, modem, USB, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via encoder 256A and decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 102 can also encrypt or decrypt digital data signals using encryptor/decryptor 258 for storage, transfer, or playback of the digital data signals.

In one embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 may utilize a secure distribution architecture to transfer data between DVR 102 and service provider 104 such that both the service data and the user's privacy are protected.

DVR 102 may be relatively independent with respect to service provider 104 or may be relatively dependent on service provider 104. In other words, some functionality is performed by an "independent" DVR that is not performed by a "dependent" DVR. In either case, DVR 102 may rely on service provider 104 for distributing certain data to DVR 102, such as electronic programming guide (EPG) data.

3.1 Home Media Engine

Under a "dependent" DVR model (referred to herein as the home media engine (HME) model), aspects of a user interface are processed by the CPU residing on DVR 102, while other aspects of the user interface are downloaded, from service provider 104, into the memory of DVR 102. For example, service provider 104 sends, to DVR 102, static display elements while DVR 102 is responsible for generating dynamic display elements. Such a split permits computationally intensive processing, such as video processing, to be performed by computing hardware originating at service provider 104, while repetitive graphics operations can be performed by the CPU residing on DVR 102. This model is "transparent" to the user, who is presented a video experience in which all content appears to reside on DVR 102 as if it were a conventional DVR.

The HME model optimizes the multimedia experience when subject to constraints on the network capacity to transmit data and commands, and constraints on the graphical processing power resident on the local device.

In a possible embodiment, the text displayed in a program list comprises a resource object passed to DVR 102 by service provider 104. In a possible embodiment, the text displayed inside a banner comprises a resource object passed to DVR 102 by service provider 104.

Events are used to relate information back to an HME application and can be generated by the user (such as when pressing a key on a remote control) or be generated as part of a stream resource, to provide information back to an HME application.

In a possible embodiment, dissemination of all multimedia content is directed by an HME server operating from one or more networked computers operated by service provider 104. The dissemination of multimedia content may be controlled by commands input by a user through a remote control device configured to interface with one or more of DVR 102, a video player (not shown), a television (not shown), personal computer 108, or portable device 110 (e.g., a cell phone and/or a personal digital assistant (PDA)). Alternatively, the remote control device is DVR 102.

3.2 User Interface

The HME model described herein is particularly useful in the design of a user interface in which simple, relatively stable graphical elements, such as buttons and text, can be quickly generated by a central processing unit (CPU) of DVR 102, leaving network 105 relatively unencumbered for receipt of streaming video files.

In a possible embodiment, the user interface is configured to replicate the TiVo service, as disclosed in commonly-assigned patent "Television Viewer Interface System," U.S. Pat. No. 6,757,906 issued Jun. 29, 2004, whose contents are hereby incorporated by reference.

4.0 Program List

A program list is a set of program listings, at least a portion of which are displayed to a user (e.g., via a television or computer monitor communicatively coupled to DVR 102). Each program listing includes data that describes the corresponding program list, such as the program's name (e.g., "House"), channel number (e.g., "2"), and the name of the program's broadcaster (e.g., "Fox"). A program listing may also include names of Web content. Non-limiting examples of Web content include a streaming video file, Internet TV, and Web pages. Thus, the program associated with a listing may be a URL.

Embodiments of the invention are not limited to any particular type of program list. For example, the program list may originate from electronic program guide (EPG) data. EPG data describes programs that are available from many different broadcasters and services such as: DirecTV®, Comcast®, CableVision®, etc. The EPG data contains information describing the program, such as the program description, program synopsis, program rating, actors, directors, producers, etc., as well as search data tags.

As another example, the program list may be a set of program listings that were previously recorded. Such a list is referred to herein as a "recorded list." The program listings in a recorded list may or may not have been explicitly selected by a user for recording. For example, some programs may be recorded based on a prediction of what programs a user may be interested in. The prediction may be based on multiple criteria, such as the user's viewing history and/or program preferences, and the current popular programs.

5.0 Program Page View

Figure 3:
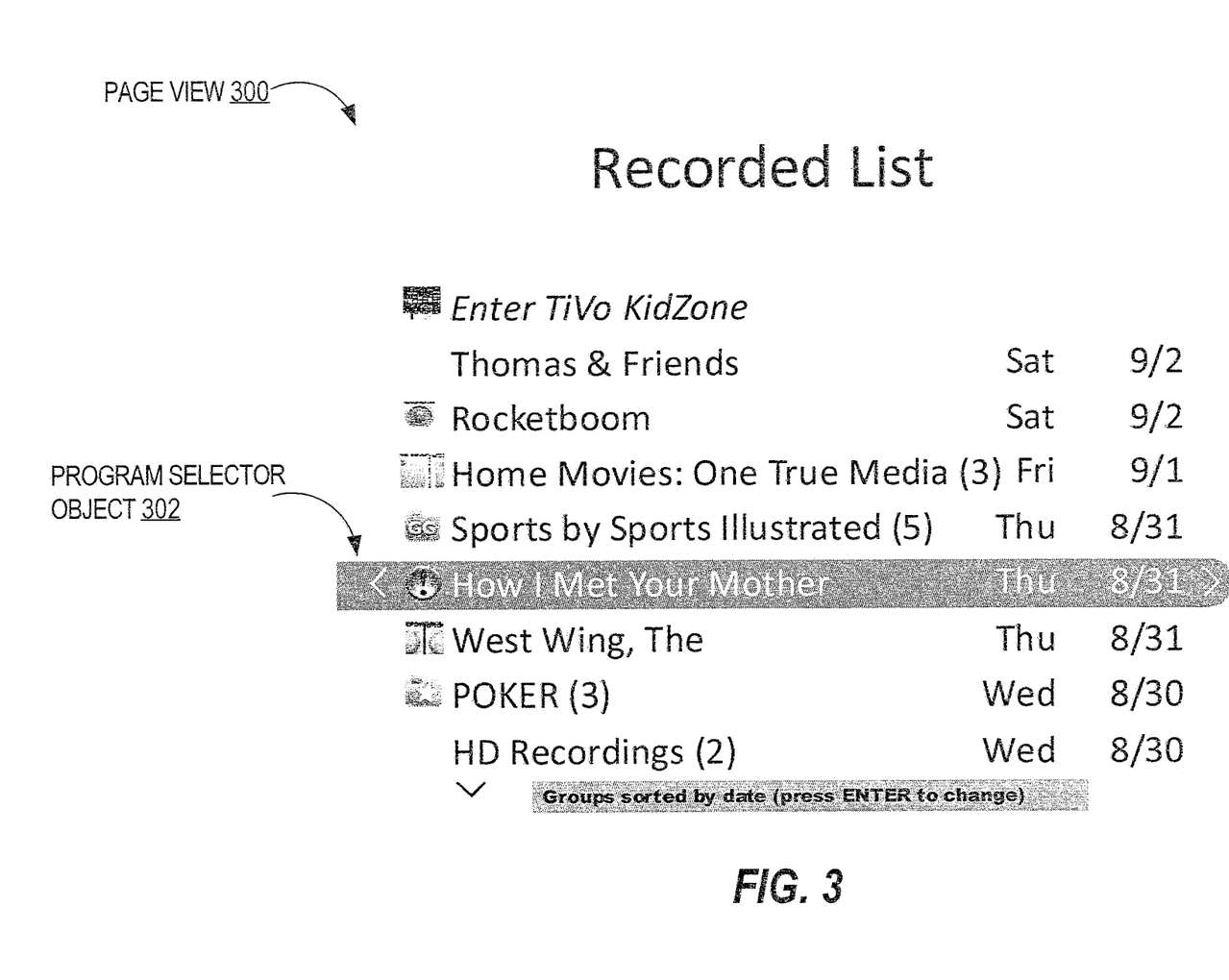
FIG. 3 is an example of a program page view, according to an embodiment of the invention.

FIG. 3 is an example of a program page view 300 (or simply "page view"), according to an embodiment of the invention. Again, a "page view" is a set of program listings that is displayed at a single instance on a display, such as a television display or a computer monitor. In the depicted example, page view 300 is a recorded list. However, page view 300 may (additionally or alternatively) include EPG data, i.e., information about programs that are currently being broadcasted or have yet to be broadcasted.

A user may view multiple page views by, e.g., selecting a page up or page down button on a remote control device. For example, an EPG program list may include information about hundreds of programs from hundreds of channels. However, only a few programs (e.g., 10) may be displayed in a single page view. Therefore, if a user desires to view all program listings that are set to begin at a particular time, then the user must "scroll" through the EPG program list or, in other words, cause multiple page views to be generated and displayed.

A program listing in a page view is "highlighted" if the program listing is visually distinguished, from other program listings in the page, based on qualities other than the graphics or other characters that are used to describe the highlighted program listing, such as the program name.

As depicted in FIG. 3, page view 300 includes a program selector object 302, which serves to highlight a particular program listing on page view 300. In the depicted example, the program listing "How I Met Your Mother" is highlighted. In this example, program selector object 302 encapsulates the entire program name. In another embodiment, program selector object 302 may be an icon that is displayed adjacent to (e.g., immediately to the left or right of) a program's name. In another embodiment, a program listing is highlighted in other ways. For example, the name of the highlighted program listing may be italicized or bolded, or displayed in a different color or font relative to the other program listings in page view 300. There are many ways in which a highlighted program listing may be visually distinguished from other programs in a page view and used in a possible embodiment.

A user uses a remote control to move program selector object 302 to other program listings in page view 300. The remote control can also be used to "page up" or "page down." The result of such paging is to display a new page with a different set of program listings. There may be zero or more (typically one) program listings that are common to both the old and new pages.

6.0 Dynamically Highlighting Program Listings Based on Selection Criteria

By default, when a page view is displayed, the top-most program listing in the page view is typically highlighted. However, according to an embodiment of the invention, the program listing in a page view that is associated with certain selection criteria is highlighted.

The steps that are performed by DVR 102 to determine which program listing in a page view will be highlighted depends on whether DVR 102 is relatively dependent on (e.g., according to the HME model) or independent from service provider 104 for performing certain functionality. The set of steps performed in the former scenario is referred to herein as the "dependent scenario," whereas the set of steps performed in the latter scenario is referred to herein as the "independent scenario."

6.1 Independent Scenario

6.1.1 EPG Data

Figure 4A:
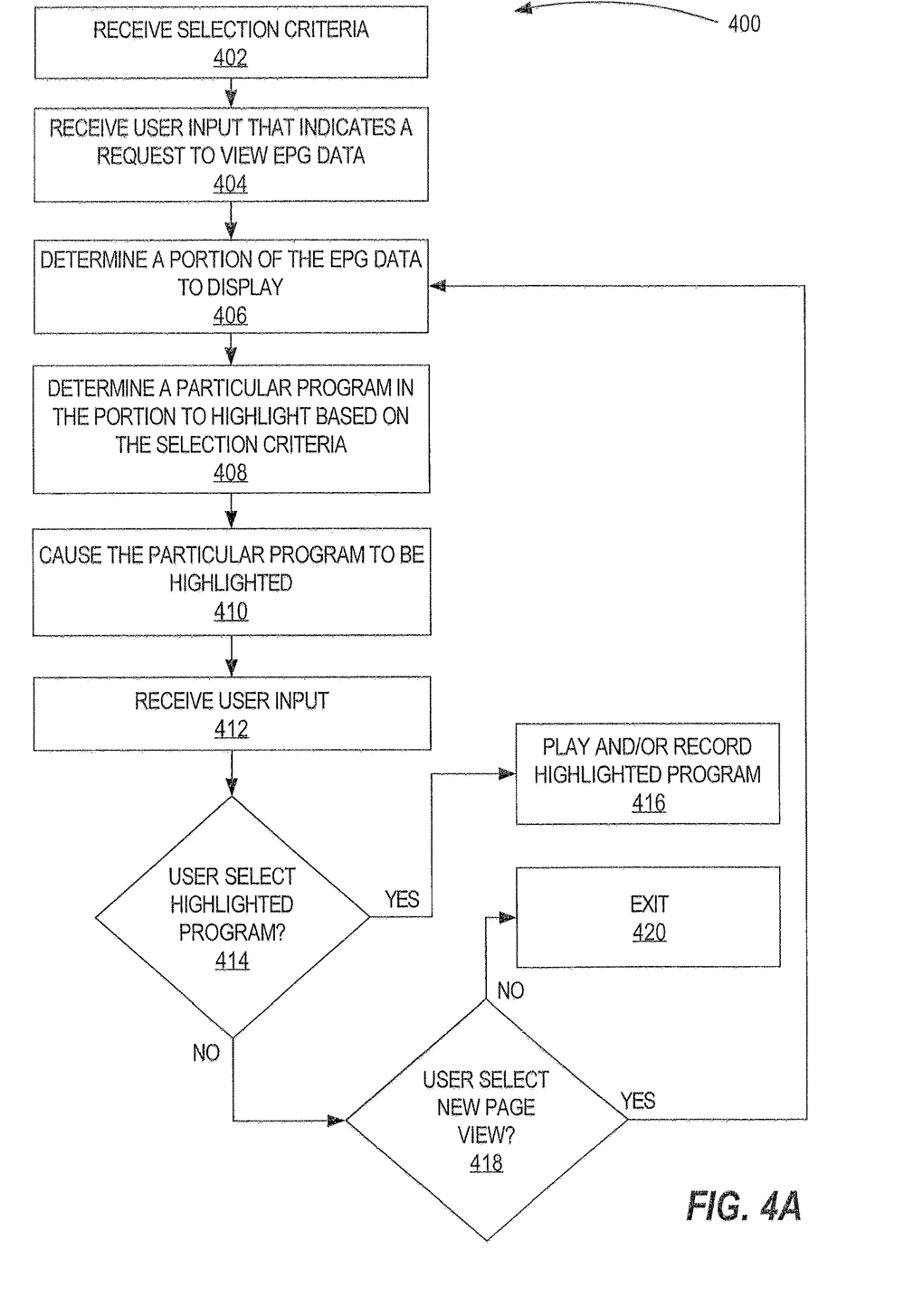
FIGS. 4A-B are flow diagrams that depict methods for determining which program in a page view to highlight, according to an embodiment of the invention.

FIG. 4A is a flow diagram that depicts a process 400 for determining which program listing in a page view of EPG data to highlight in the independent scenario, according to an embodiment of the invention. At step 402, DVR 102 receives selection criteria from service provider 104. The selection criteria identifies one or more programs or one or more broadcasters that have contracted with service provider 104 to have one or more of their respective program listings highlighted in a page view.

At step 404, DVR 102 receives user input (e.g., via a DVR remote control) that indicates a request to view EPG data.

At step 406, DVR 102 determines a portion of the EPG data to display in a page view. The portion includes a plurality of program listings. This determination may be based on what program or channel was last viewed. For example, if the user was last viewing program X on channel 21, then the currently-broadcasted program on channel 21 will be at the top (or middle) of the list. Alternatively, the result of this determination may be always to display first the program listings that are associated with the lowest channel numbers (e.g., channels 2-10).

At step 408, in response to the user input, DVR 102 determines a particular program listing, in the plurality of program listings, to highlight in the page view. This determination is based on the selection criteria received in step 402.

At step 410, while causing the plurality of program listings to be displayed on a display, DVR 102 causes the particular program listing to be highlighted in the display.

At step 412, DVR 102 receives input from the user.

At step 414 DVR 102 determines whether the input is a selection of the highlighted program listing. If so, then, at step 416, DVR 102 begins playing the program that corresponds to the highlighted program listing, begins recording that program, or both, depending on the specific user input. Alternatively, DVR 102 may be configured to automatically record any programs that a user selects for immediate viewing.

In one embodiment, only a single input from a user (e.g., the selection of an "Enter" or "Go" button on a DVR remote control) is required to cause the highlighted program listing to be played and/or recorded. In another embodiment, multiple inputs from a user may be required to cause a highlighted program listing to be played and/or recorded. This may be this case if, e.g., multiple program listings are highlighted on a page simultaneously.

If the user did not select the highlighted program listing, then, at step 418, DVR 102 determines whether the user input indicates the selection of a new page view. If so, the process returns to step 406, where DVR 102 determines a new portion of the EPG data to display. For example, the user input may be a "page up" or "page down" command.

The new portion of the EPG data may overlap with the previous portion. For example, the new portion may include a program listing that was displayed at the bottom of the previous page view. Thus, the resulting new page view (that corresponds to the new portion) includes that same program listing at the top of the new page view.

If the user input does not indicate the selection of a new page view, then, at step 420, the process 400 exits. For example, the user input may cause DVR 102 to turn off or power down or may cause a recorded list to display.

In some page views, no program listings are associated with selection criteria and, thus, no program listings will be highlighted using selection criteria in those page views. In those cases, process 400 may skip from step 406 to step 412 (i.e., receive user input), and then to step 418 (i.e., new page view selection) and back to step 406.

6.1.2 Recorded List

Figure 4B:
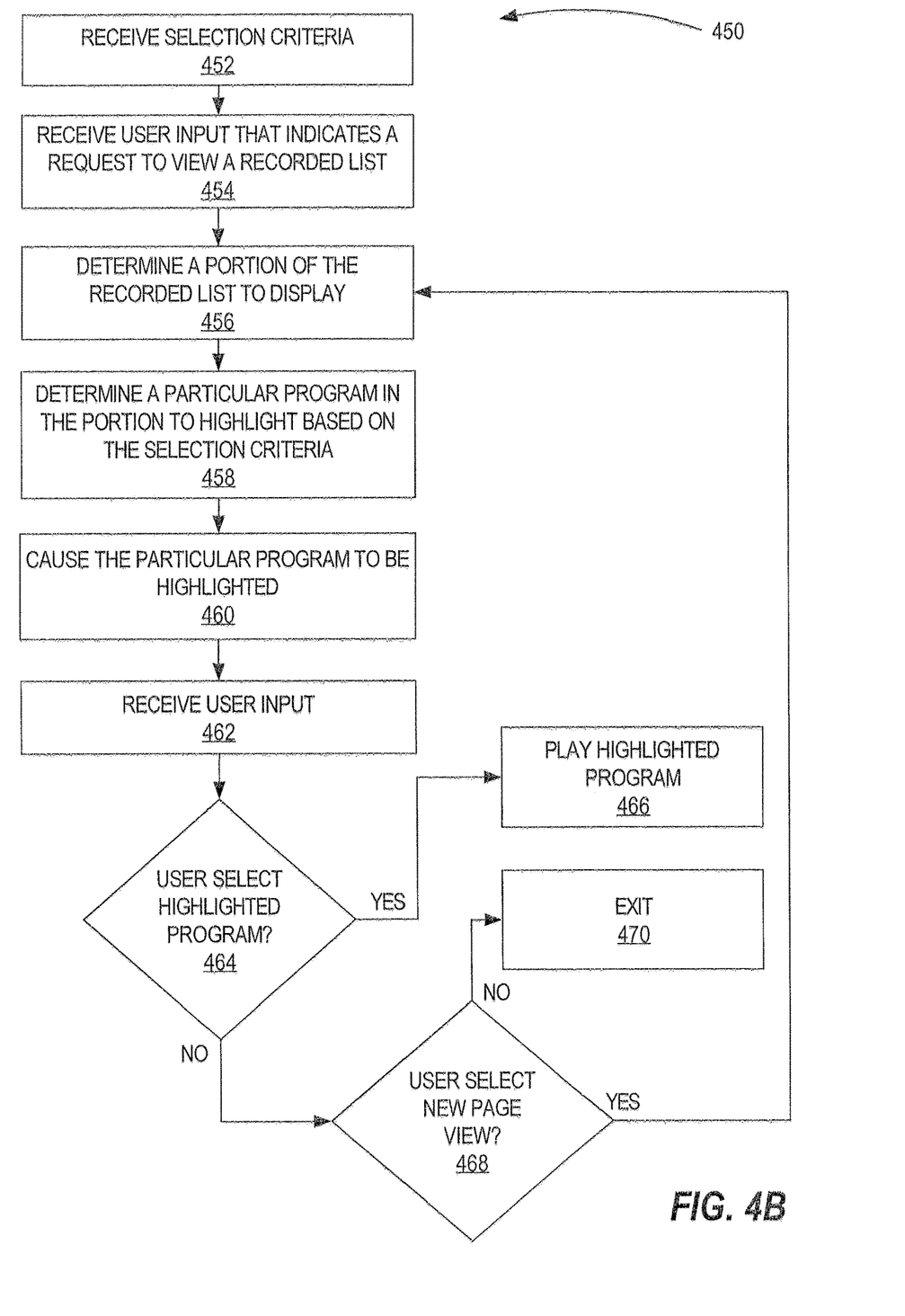

FIG. 4B is a flow diagram that depicts a process 450 for determining which program listing in a page view of a recorded list to highlight in the independent scenario, according to an embodiment of the invention. At step 452, DVR 102 receives selection criteria from service provider 104.

At step 454, DVR 102 receives user input (e.g., via a DVR remote control) that indicates a request to view a recorded list. In an embodiment, multiple recorded lists are separately maintained. For example, one recorded list may be maintained for sporting programs and another recorded list may be maintained for news programs. Thus, the user input may indicate one of the recorded lists to view.

At step 456, DVR 102 determines a portion of the recorded list to display in a page view. The portion includes a plurality of program listings.

At step 458, in response to the user input, DVR 102 determines a particular program, in the plurality of programs, to highlight in the page view. This determination is based on the selection criteria received in step 452.

At step 460, while causing the plurality of program listings to be displayed on a display, DVR 102 causes the particular program listing to be highlighted in the display.

At step 462, DVR 102 receives input from the user.

At step 464 DVR 102 determines whether the input is a selection of the highlighted program listing. If so, then, at step 466, DVR 102 begins playing the highlighted program listing (which was earlier recorded).

If the user did not select the highlighted program listing, then, at step 468, DVR 102 determines whether the user input indicates the selection of a new page view. If so, the process returns to step 456, where DVR 102 determines a new portion of the recorded list to display. For example, the user input may be a "page up" or "page down" command.

If the user input does not indicate the selection of a new page view, then, at step 470, process 450 exits. For example, the user input may cause DVR 102 to turn off or power down or may cause EPG data to display.

6.2 Selection Criteria for Highlighting a Program Listing

One or more selection criteria are used to select which program listing, of a plurality of program listings, to highlight. The selection criteria that are used to ultimately determine which program listing to highlight may be ordered, such that if the first criterion of the selection criteria does not determine a single program listing to highlight, then the second criterion of the selection criteria is used. If the second criterion does not determine a single program listing to highlight, then the third criterion of the selection criteria is used, and so forth.

For example, the first criterion may be whether a contract is associated with any of the program listings that are to be displayed in a page view. If only one program listing is associated with a contract, then that program listing is highlighted in the page view. If multiple program listings are associated with one or more contracts, then the second criterion is used, which may be the program listing associated with the contract that has the highest contract value-to-page view ratio. If multiple program listings have the same such ratio, then the third criterion is used, which may be the program listing associated with the highest contract value. If multiple program listings have the same such contract value, then a fourth criterion is used, which may be the contract with the fewest page views remaining to trigger a payment. The last criterion of the selection criteria (i.e., the ultimate "tie-breaker") may be the time at which the contract was formed.

To illustrate, consider the following example. Ten program listings are to be displayed in a page view. Three of the ten program listings (X, Y, and Z) are associated with selection criteria. The contracts associated with program listings X and Y both indicate a total contract value of $4,000. The contract associated with program listing Z indicates a total contract value of $2,000. The contract value-to-page view ratio of the contracts associated with X and Z are $0.20 per page view while the contract value-to-page view ratio of the contracts associated with Y is $0.25 per page view. During the first phase of selection, because only program listings X, Y, and Z are associated with contracts, the remaining seven contracts are removed from consideration. The second criterion may be highest contract value. In that selection phase, program listing Z is removed from consideration. The third criterion may be highest contract value-to-page view ratio. In that selection phase, program listing X is removed from consideration. Because program Y is the last remaining program listing, program listing Y is highlighted in the page view.

A contract is not limited to being associated with a single program listing. A contract may be (either explicitly or implicitly) associated with multiple program listings. For example, broadcaster A may contract to have each of the program listings associated with broadcaster A highlighted.

Because the selection criteria may change continuously (e.g., due to newly formed contracts, contracts that expire, and change in the number of page views remaining to trigger a payment), service provider 104 provides, to DVR 102 (i.e., in the independent DVR scenario), selection criteria on a regular or non-regular basis. For example, service provider 104 may provide selection criteria to DVR 102 once a day and/or whenever a new contract is formed. Service provider 104 may "push" (or initiate the sending of) the selection criteria to DVR 102 or DVR 102 may "pull" the selection criteria from service provider 104.

6.3 Format of Selection Criteria

The format of the selection criteria that service provider 104 sends to DVR 102 (i.e., in the independent scenario) may vary from one implementation to another. Embodiments of the invention are not limited to any particular implementation.

In each of these example implementations, the selection criteria may be demographically and/or geographically-oriented. For example, broadcaster A may contract with service provider 104 to have program listing X highlighted in page views only for users that are male, under 30 years of age, and reside in the Pacific Time Zone.

In the independent scenario, service provider 104 may provide such information to DVR 102. Thus, DVR 102 may be responsible for comparing these selection criteria against the corresponding demographic and geographic information of the user of DVR 102 in order to determine whether program listing X is to be highlighted in a page view that is displayed to the user.

Alternatively, service provider 104 uses any demographic and geographic information to generate different sets of selection criteria and then sending the appropriate selection criteria to each DVR. Thus, service provider 104 may send one set of selection criteria to a DVR associated with a male user in California, a different set of selection criteria to a DVR associated with a female user in California, and a very different set of selection criteria to a DVR associated with an elderly user in New York.

6.3.1 Ordered List

In one example format, service provider 104 sends, to DVR 102, a single ordered list of program names or program identifiers with, optionally, the associated broadcaster of each program. The order of the list is based on selection criteria, such as the selection criteria discussed above. For example, the program listings at the beginning of the list may be associated with the highest contract value-to-page view ratio. If there are two or more program listings with the same contract value, then the program listing associated with the highest contract value-to-page view ratio may be higher in the list than the other program listings associated with the same contract value.

An ordered list of program identifiers may be preferable to an ordered list of program names because the program name listed from different broadcasters is not always the same in EPG data.

The ordered list may also include rankings in another field. The rankings may indicate that two or more program listings are associated with the same ranking. For example, if a page view is to include program listings X and Y and program listings X and Y are associated with the same ranking, then DVR 102 may select program listing X to highlight. DVR 102 then stores history data that indicates that program listing X was last highlighted. In a subsequent page view that is to include program listings X and Y, DVR 102 uses the history data to determine that program listing Y will be highlighted instead of program listing X. DVR 102 then updates the history data to indicate that program listing Y was last highlighted.

If the ordered list includes broadcaster information, then the list may include a unique identifier for each broadcaster in the list. Broadcaster information may be used when the rankings of two or more program listings are the same and the two or more program listings will appear in the same page view. Then, DVR 102 may store history data that indicates that a program listing of a particular broadcaster was last highlighted. In a subsequent page view that is to include program listings that "conflict," DVR 102 uses the history data to determine that the program listing that is not associated with the particular broadcaster will be highlighted. DVR 102 then updates the history data to indicate that the "new" broadcaster whose program listing was last highlighted.

The ordered list may also include date and time information for specific shows, an expiration date, and/or a date for a premier of a particular program. For example, the date and time information in the ordered list may indicate that program listing X is to be highlighted only when program listing X is listed in a page view in December. As another example, the date and time information may indicate that only the premier showing of program listing Y is to be highlighted when the premier showing of program listing Y is in a page view.

The ordered list may also apply to advertisements or product offerings that a user can view and/or purchase.

In response to a page view request, DVR 102 determines a set of program listings to display in the page view. DVR 102 may have to check the ordered list for each program listing in the set. The program listing in the set that is the first program listing or closest to the first program listing in the ordered list (relative to other program listings in the set of program listings) is selected as the program listing to highlight in the page view.

6.3.2 Database Elements

In another example format, service provider 104 sends, to DVR 102, searchable database elements. The database elements may comprise one or more relational tables that each comprises multiple columns and multiple rows. Each row corresponds to a particular program. One or more fields contain program names and/or program identifiers. One or more fields may contain broadcaster names and/or broadcaster identifiers. A separate field may exist for each selection criterion described above. Additionally or alternatively, a separate field may contain a ranking that is based on one or more selection criteria, regardless of whether the rows in the table are ordered based on the one or more selection criteria.

In response to a page view request, DVR 102 determines a set of program listings to display in the page view. DVR 102 may have to check the database elements for each program listing in the set. The program listing in the set that is associated with the highest ranking is selected as the program listing to highlight in the page view.

6.3.3 Alpha List

In another example format, service provider 104 sends, to DVR 102, a list of programs that is ordered alphanumerically (referred to herein as an "alpha list"). Each entry in an alpha list may have an associated value (e.g., a ranking) that DVR 102 uses to determine which program listing to highlight. This value may be used only when two or more program listings to be displayed in a page view appear in the alpha list.

In an embodiment, service provider 104 sends one or more alpha lists to DVR 102. For example, one alpha list could be ordered by program name or program identifier. A second alpha list could be ordered by broadcaster name or broadcaster identifier. Each entry in the second alpha list may include rating data that indicates (a) how many contracts are associated with the corresponding broadcaster and/or (b) the monetary value of the contracts associated with the corresponding broadcaster. A third alpha list could be ordered by date and/or time where each entry includes an associated program name or program identifier.

In response to a page view request, DVR 102 determines a set of program listings to display in the page view. DVR 102 checks the first alpha list for each program listing in the set. The program listing in the set that is associated with the highest ranking is selected as the program to highlight in the page view.

If there are two or more program listings in the set of program listings that are associated with the same ranking in the first alpha list, then the second alpha list is accessed to determine, based on broadcaster rating, which of the two or more program listings to highlight. If there still a tie between two or more program listings, then the third list is accessed to determine which of the program listings to highlight using the program showing date and time and comparing that to the program name in the third list and the listed data and time.

6.4 Dependent Scenario

As indicated previously, some (or all) of the steps performed in the dependent scenario are performed by a different entity than the steps performed in the independent scenario. For example, in the dependent scenario, most of the steps are performed by service provider 104. Specifically, in process 400 (i.e., associated with EPG data), at step 402, service provider 104 receives contract data from one or more broadcasters and generates selection criteria. At step 404, DVR 102 forwards a user's page view request to service provider 104. At step 406, service provider 104 determines a portion of the EGP data to display in the page view.

At step 408, service provider 104 determines which program listing in the portion to highlight. At step 410, service provider 104 causes the requested page view to be displayed on the user's display by providing, to DVR 102, the requested page along with data (e.g., in XML format) that indicates which program listing is to be highlighted. In turn, DVR 102 causes the page view (including the highlighted program listing) to be displayed.

At step 418, service provider receives, from DVR 102, new page view data that indicates that the user would like to view a new page view. The process then proceeds to step 406 where service provider 104 determines a different portion of the EPG data to display in the new page view.

In the above description, reference has been made to "broadcaster." The term "broadcaster" includes broadcasters and networks. For example, one example of a network is CBS, whereas a local broadcaster of content from CBS is KPIX in the San Francisco Bay Area.

7.0 Business Models

The capability of a DVR to highlight certain program listings makes several business models advantageous for service provider 104 and broadcasters or networks. Multiple related business models may be employed. Non-limiting examples of such business models include a "pay for highlight only" business model, a "pay for view only" business model, and a hybrid of the above two models.

In the "pay for highlight only" business model, service provider 104 enters into an agreement with a broadcaster or network to highlight one or more program listings that the broadcaster broadcasts. The agreement indicates that the broadcaster or network promises to compensate service provider 104 for a number of times a program listing of a program (i.e., that is broadcasted by the broadcaster) is highlighted in a page view. For example, broadcaster A enters an agreement, with service provider 104, that broadcaster A will compensate service provider 104 with $2,000 for every 10,000 page views (displayed to users) that have program listing X highlighted.

In a related business model, service provider 104 tracks not only when a program listing is highlighted, but also whether the highlighted program listing is selected by a DVR user while the program listing is highlighted. Based on this information regarding a particular program, service provider 104 informs the corresponding broadcaster how successful, in terms of viewership, the highlighting of the program listing is. For example, service provider 104 maintains statistics that indicate (1) how many DVR users viewed program X when the corresponding program listing was not highlighted and (2) how many DVR users viewed program X when the corresponding program listing was highlighted. All of this information is recorded by each DVR and sent to the service provider. If the second value is significantly higher than the first value, then the highlighting of the program listing may be causing more DVR users to view it. Thus, service provider 104 can inform the broadcaster of program X of these statistics to negotiate a higher contract value or at least a higher contract value-to-page view ratio. If there appears to be little difference between the first and second values, then service provider 104 may inform the broadcaster and suggest paying for a different program listing to highlight.

In the "pay for view only" business model, an agreement between a broadcaster and service provider 104 may require that one or more users record or view the program that corresponds to the highlighted program listing in order to trigger any payment from the broadcaster. Thus, even if program listing X is highlighted in a page view, the agreement requires that the highlighted program listing also be selected by users for recording or viewing. For example, broadcaster A enters an agreement, with service provider 104, that broadcaster A will compensate service provider 104 with $2,000 for every 2,000 recordings and/or views of program X when the program listing for program X is highlighted.

In a hybrid of the "pay for highlight only" and "pay for view only" business models, service provider 104 contracts with a broadcaster to receive, from the broadcaster: (1) a first amount of compensation when one of the broadcaster's program listings is highlighted; and (2) a second amount of compensation when the highlighted program listing is selected by a user for recording or viewing.

It is possible that agreements with different broadcasters may conflict with each other. For example, broadcaster A wants program listing X to be highlighted while broadcaster B wants program listing Y to be highlighted. However, both program listing X and program listing Y may appear (e.g., due to the proximity of their respective channel numbers) on the same page that is displayed to a DVR user. Broadcaster A agreed to pay $2,000 for 10,000 page views that have program listing X highlighted. Broadcaster B agreed to pay $4,000 for 25,000 page views that have program listing Y highlighted. Although broadcaster B is associated with the higher contract value, broadcaster A is associated with a higher contract value-to-page view ratio (i.e., $0.20 per page view v. $0.16 per page view). Thus, service provider 104 may (a) notify broadcaster B that a conflict exists and (b) invite broadcaster B to (1) increase the contract value from $4,000 to, e.g., $5,000 or more or (2) decrease the number of page views that have program listing Y highlighted from 25,000 to, e.g., 20,000 or less.

Alternatively, in order to avoid conflicts, program listings may be shifted or re-ordered to move a program listing to another page view without any conflicts.

8.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
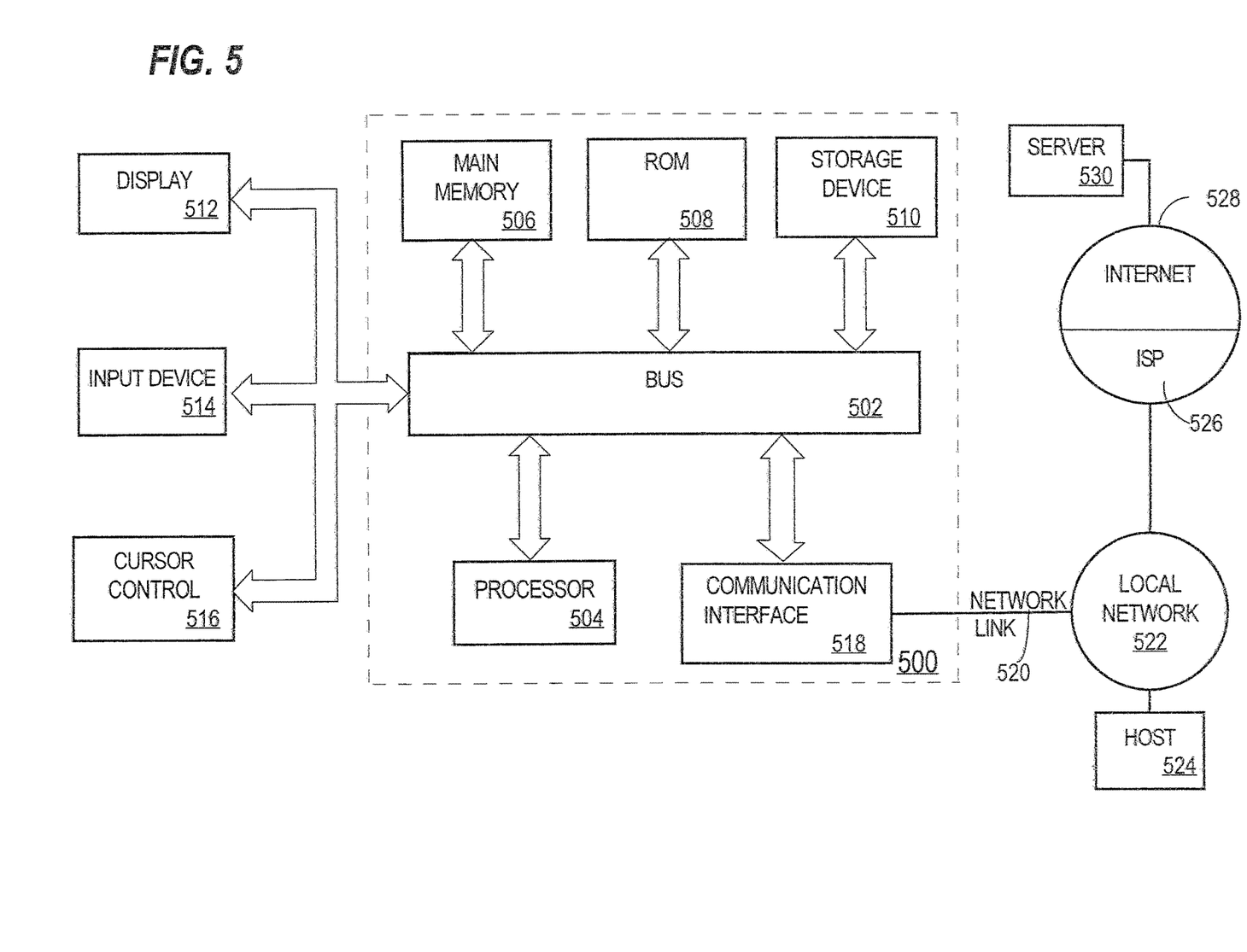
FIG. 5 depicts a computer system on which possible embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving selection criteria from a service provider, wherein the selection criteria comprises a contracted content item listing;
receiving a user request from a user to view a recorded list comprising one or more content items recorded for the user;
in response to receiving the user request:
identifying a content item last viewed by the user; and
determining a set of first content item listings, the set of first content item listings comprising a subset of the recorded list including a listing for the content item last viewed by the user;
generating for display the set of first content item listings in a first page view displayed at a client device, the first page view displaying all items of the set of first content item listings in a single instance;
after determining the set of first content item listings including the listing for the content item last viewed by the user, applying the selection criteria to the set of first content item listings;
in response to the application of the selection criteria to the set of first content item listings, determining that a specific content item listing in the set of first content item listings satisfies the selection criteria;
while causing the set of first content item listings in the first page view to be displayed at the client device, automatically positioning a content selector object over the specific content item listing to cause the specific content item listing to be highlighted in the first page view by being visually distinguishable from other first content item listings in the set of first content item listings in the first page view;
receiving, from the client device, user selection data of the content selector object that indicates a user selection of the specific content item listing while the specific content item listing is highlighted;
based on the user selection data, updating selection statistical data that indicates a total number of times the specific content item listing was selected by a first plurality of users including the user while the specific content item listing was highlighted on displays of a first plurality of client devices;
calculating a difference between (1) the total number of times the specific content item listing was selected by the first plurality of users while the specific content item listing was highlighted on displays of the first plurality of client devices, and (2) a total number of times the specific content item listing was selected by a second plurality of users while the specific content item listing was not highlighted on displays of a second plurality of client devices; and
causing to be transmitted the calculated difference to a broadcaster,
wherein the method is performed on one or more computing devices.

2. The method of claim 1, wherein the set of first content item listings that includes the specific content item listing includes a second content item listing that is different than the specific content item listing; the method further comprising: updating, based on the user selection data, the selection statistical data to indicate a total number of times the second content item listing was selected by the plurality of users while the second content item listing was highlighted on the displays of the plurality of client devices.

3. The method of claim 1, further comprising: sending, to a provider of the program indicated by the specific content item listing, a report that is based on the selection statistical data.

4. The method of claim 1, further comprising: receiving highlight criteria that are used to select one or more programs that includes the first program for being highlighted.

5. The method of claim 1, wherein the plurality of client devices includes one or more of: digital video recorders, personal computers, handheld devices, or display devices.

6. The method of claim 1, further comprising causing a selection ratio to be generated, the selection ratio being generated by determining how often a content item listing was selected when the content item listing was highlighted based at least in part on the selection statistical data.

7. The method of claim 1, wherein the plurality of selection criteria comprises a content provider listing of one or more content items which have been contracted for with a service provider.

8. The method of claim 1, further comprising:
in response to a determination that the specific content item listing in the set of first content item listings does not satisfy the selection criteria:
applying a second selection criteria, distinct from the first selection criteria, to the set of first content item listings;
determining that a specific content item listing in the set of first content item listings satisfies the second selection criteria;
while causing the set of first content item listings in the first page view to be displayed at the client device, automatically positioning a content selector object over the specific content item listing to cause the specific content item listing to be highlighted in the first page view by being visually distinguishable from other first content item listings in the set of first content item listings in the first page view;
receiving, from the client device, user selection data of the content selector object that indicates a user selection of the specific content item listing while the specific content item listing is highlighted; and
based on the user selection data, updating selection statistical data that indicates a total number of times the specific content item listing was selected by a plurality of users including the user while the specific content item listing was highlighted on displays of a plurality of client devices.

9. One or more non-transitory computer-readable media storing one or more sets of instructions which, when executed by one or more processors, cause the one or more processors to perform:
receiving selection criteria from a service provider, wherein the selection criteria comprises a contracted content item listing with a highest contract value;
receiving a user request from a user to view a recorded list comprising one or more content items recorded for the user;
in response to receiving the user request:
identifying a content item last viewed by the user; and
determining a set of first content item listings, the set of first content item listings comprising a subset of the recorded list including a listing for the content item last viewed by the user;
generating for display the set of first content item listings in a first page view displayed at a client device, the first page view displaying all items of the set of first content item listings in a single instance;
after determining the set of first content item listings including the listing for the content item last viewed by the user, applying the selection criteria to the set of first content item listings;
in response to the application of the selection criteria to the set of first content item listings, determining that a specific content item listing in the set of first content item listings satisfies the selection criteria;
while causing the set of first content item listings in the first page view to be displayed at the client device, automatically positioning a content selector object over the specific content item listing to cause the specific content item listing to be highlighted in the first page view by being visually distinguishable from other first content item listings in the set of first content item listings in the first page view;
receiving, from the client device, user selection data of the content selector object that indicates a user selection of the specific content item listing while the specific content item listing is highlighted;
based on the user selection data, updating selection statistical data that indicates a total number of times the specific content item listing was selected by a plurality of users including the user while the specific content item listing was highlighted on displays of a plurality of client devices;
calculating a difference between (1) the total number of times the specific content item listing was selected by the first plurality of users while the specific content item listing was highlighted on displays of the first plurality of client devices, and (2) a total number of times the specific content item listing was selected by a second plurality of users while the specific content item listing was not highlighted on displays of a second plurality of client devices; and
causing to be transmitted the calculated difference to a broadcaster.

10. The medium of claim 9, wherein the set of first content item listings that includes the specific content item listing includes a second content item listing that is different than the specific content item listing; wherein the one or more sets of instructions which, when executed by one or more processors, further cause the one or more processors to update, based on the user selection data, the selection statistical data to indicate a total number of times the second content item listing was selected by the plurality of users while the second content item listing was highlighted on the displays of the plurality of client devices.

11. The medium of claim 9, wherein the one or more sets of instructions which, when executed by one or more processors, further cause the one or more processors to send, to a provider of the program indicated by the specific content item listing, a report that is based on the selection statistical data.

12. The medium of claim 9, wherein the one or more sets of instructions which, when executed by one or more processors, further cause the one or more processors to receive highlight criteria that are used to select one or more programs that includes the first program for being highlighted.

13. The medium of claim 9, wherein the plurality of client devices includes one or more of: digital video recorders, personal computers, handheld devices, or display devices.

14. The medium of claim 9, wherein the one or more sets of instructions which, when executed by one or more processors, further cause the one or more processors to cause a selection ratio to be generated, the selection ratio being generated by determining how often a content item listing was selected when the content item listing was highlighted based at least in part on the selection statistical data.

15. An apparatus comprising:
one or more processors;
one or more non-transitory computer-readable media storing one or more sets of instructions which, when executed by one or more processors, cause the one or more processors to perform:

receiving selection criteria from a service provider, wherein the selection criteria comprises a contracted content item listing with a highest contract value;

receiving a user request from a user to view a recorded list comprising one or more content items recorded for the user;

in response to receiving the user request:
identifying a content item last viewed by the user; and
determining a set of first content item listings, the set of first content item listings comprising a subset of the recorded list including a listing for the content item last viewed by the user;

generating for display the set of first content item listings in a first page view displayed at a client device, the first page view displaying all items of the set of first content item listings in a single instance;

after determining the set of first content item listings including the listing for the content item last viewed by the user, applying the selection criteria to the set of first content item listings;

in response to the application of the selection criteria to the set of first content item listings, determining that a specific content item listing in the set of first content item listings satisfies the selection criteria;

while causing the set of first content item listings in the first page view to be displayed at the client device, automatically positioning a content selector object over the specific content item listing to cause the specific content item listing to be highlighted in the first page view by being visually distinguishable from other first content item listings in the set of first content item listings in the first page view;

receiving, from the client device, user selection data of the content selector object that indicates a user selection of the specific content item listing while the specific content item listing is highlighted;

based on the user selection data, updating selection statistical data that indicates a total number of times the specific content item listing was selected by a plurality of users including the user while the specific content item listing was highlighted on displays of a plurality of client devices;

calculating a difference between (1) the total number of times the specific content item listing was selected by the first plurality of users while the specific content item listing was highlighted on displays of the first plurality of client devices, and (2) a total number of times the specific content item listing was selected by a second plurality of users while the specific content item listing was not highlighted on displays of a second plurality of client devices; and causing to be transmitted the calculated difference to a broadcaster.

16. The apparatus of claim 15, wherein the set of first content item listings that includes the specific content item listing includes a second content item listing that is different than the specific content item listing; wherein the one or more sets of instructions which, when executed by one or more processors, further cause the one or more processors to update, based on the user selection data, the selection statistical data to indicate a total number of times the second content item listing was selected by the plurality of users while the second content item listing was highlighted on the displays of the plurality of client devices.

17. The apparatus of claim 15, wherein the one or more sets of instructions which, when executed by one or more processors, further cause the one or more processors to send, to a provider of the program indicated by the specific content item listing, a report that is based on the selection statistical data.

18. The apparatus of claim 15, wherein the one or more sets of instructions which, when executed by one or more processors, further cause the one or more processors to receive highlight criteria that are used to select one or more programs that includes the first program for being highlighted.

19. The apparatus of claim 15, wherein the plurality of client devices includes one or more of: digital video recorders, personal computers, handheld devices, or display devices.

20. The apparatus of claim 15, wherein the one or more sets of instructions which, when executed by one or more processors, further cause the one or more processors to cause a selection ratio to be generated, the selection ratio being generated by determining how often a content item listing was selected when the content item listing was highlighted based at least in part on the selection statistical data.

* * * * *